Patented Sept. 2, 1952

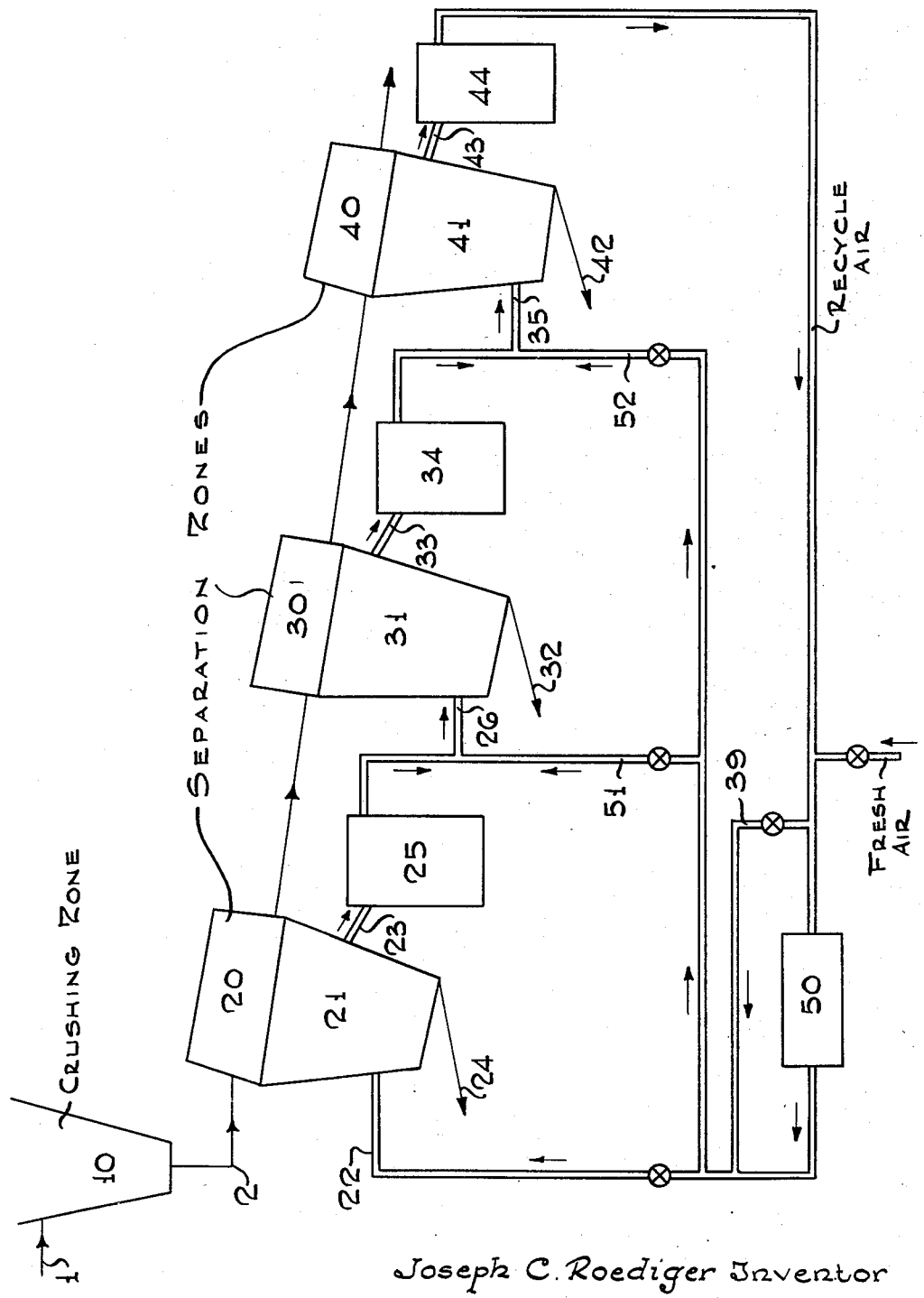

2,609,305

UNITED STATES PATENT OFFICE 2,609,305

PROCESS FOR PREPARING ASPHALT COATED AGGREGATE

Joseph C. Roediger, Brooklyn, N. Y., assignor to Standard Oil Development Company, a corporation of Delaware Application July 24, 1947, Serial No. 763,199

3 Claims. (Cl. 106—281)

The present invention relates to the coating of mineral aggregates with bituminous compositions. It is particularly directed to an improved process by which a more firm and permanent bond is secured between the coatings and the aggregates with resultant increase in the durability of the finished product. In accordance with my invention an improvement in the durability and water resistance of asphalt paving mixtures is secured by treating mineral aggregates with alkyl halide silanes prior to coating the mineral aggregates with bituminous material.

A specific and preferred embodiment of my process comprises treating the mineral aggregate with methyl trichlorsilane prior to coating the same with a bituminous material.

It has heretofore been required to dry mineral aggregates, as, for example, crushed stone, crushed rock, sand, and soil, which are to be bonded by means of asphalt, since it is very difficult to obtain a uniform coating of asphalt in the presence of water. This is especially necessary when the mixture is made with a semi-solid or solid asphalt requiring high temperatures for application. Heretofore various additives have been used with the asphalt in order to secure satisfactory coating and bonding of wet mineral aggregates. For example, it is known to treat asphalt with aliphatic organic amines in order to secure an asphalt composition having suitable coating and bonding properties. On mixing a wet mineral aggregate with an asphalt containing no additives, unsatisfactory coating is frequently obtained, with the result that the mineral aggregate is only partially coated. This partially coated aggregate is easily stripped of the asphalt, especially if there is an exposure to the action of water, by a heavy rainfall for example, during or shortly after the laying operation.

One object of the present invention is to permit the coating of the surfaces of damp or wet aggregates with a bituminous composition in such a manner that the coating obtained is satisfactory and produces a firmly bonded mass. Another object of the invention is to prepare a paving mixture bonded with asphalt in which the asphalt coating when applied to either dry or wet aggregate is not readily displaced or stripped when subjected to the action of water. Other objects of the invention will be readily understood from the following description of the same.

I have now discovered that improved bituminous paving mixtures may be readily prepared by treating mineral aggregates, such as crushed stone and the like, with an alkyl halide silane or a mixture of alkyl halide silanes. A preferred embodiment of my invention is to employ vaporizable alkyl halide silanes, as, for example, methyl trichlorsilane. In accordance with a specific adaptation of my invention, I treat a mineral aggregate with a vaporized alkyl halide silane contained in the stream of air utilized to remove dust from the mineral aggregate in its preparation at a crushing plant. Satisfactory silanes are, for example, methyl chlorsilane, ethyl chlorsilane, propyl chlorsilane, butyl chlorsilane, methyl bromsilane, methyl iodosilane, ethyl florsilane, propyl iodosilane, butyl bromsilane, and the like. Mixed halide silanes may also be used. In general, my preferred compounds are alkyl chlorsilanes, the alkyl group of which contains from one to four carbon atoms in the molecule. Monomers or polymers of these compounds may be used. A very desirable silane comprises methyl trichlorsilane.

When mineral aggregates are treated in accordance with my invention and exposed to the silanes, a reaction occurs at the aggregate surface between the mineral constituents and the silane. This reaction decreases the natural affinity of the aggregate for water, and increases its oil retaining properties, that is, the natural hydrophilic character of most of the aggregate is changed and it becomes hydrophobic. My silane pretreatment of mineral aggregate renders oil or asphalt coated aggregate highly resistant to the stripping action of water, which normally tends to displace oil or asphalt from the surface of untreated aggregate. Thus, paving mixtures made with road oil, flux asphalt, paving asphalt, hard asphalt-flux combinations or with cutback asphalts, show an improved durability since the oil or asphalt film on the aggregate will be more firmly bonded to silane treated aggregate and will be resistant to displacement by water under the conditions of normal service.

My invention generally covers the treatment of mineral aggregate such as crushed stone with a silane. As pointed out heretofore, it is preferred that the silane be a vaporizable silane, as for example, methyl trichlorsilane. It is to be understood, however, that the mineral aggregate may be treated with liquid silanes having relatively low vapor pressures at normal temperatures. A particular and preferred adaptation of my process is to subject the mineral aggregate to treatment with a vaporizable silane. This is preferably accomplished, for example, when crushed stone is employed as the mineral aggregate, at the crushing plant. In normal stone crushing plant operations it is the usual procedure to blow the crushed stone with an air stream in order to reduce the amount of dust on the stone aggregate. In accordance with the preferred adaptation of my invention, I combine with the air a sufficient quantity of a vaporized silane as, for example, methyl trichlorsilane. This air stream containing the vaporized halide silane is passed over the stone in order to remove the dust and to treat the mineral aggregate with the vapors of halide silane. The treating stream containing dust and halide silane is then passed through filtering or equivalent means wherein the dust particles are removed from the air treating stream. It is preferred to recycle this air stream containing halide silane, and which has been substantially freed of dust, to the crushed stone. In this embodiment of my invention as stated, I prefer to use methyl trichlorsilane in conjunction with the air stream. Although any amount of the halide silane may be employed, in general when employing methyl trichlorsilane I prefer that the amount of methyl trichlorsilane in the air stream being used to remove dust from the crushed stone be not in excess of about 10%. It is preferred to use the monomer of methyl trichlorsilane although a polymer may also be used. Any polymer having a viscosity less than 10 centistokes at 25° C. is suitable although more volatile polymers having a viscosity less than 2 centistokes at 25° C. are preferable.

In general, it is preferred that the temperature of the air treating stream containing the silane be about atmospheric temperature. It is understood, however, that the temperature of the air stream may be raised in order to secure vaporization of the silane. However, in general I prefer to secure vaporization of the silane in the air stream by atomizing the same into the air stream. Other equivalent means may be employed as, for example, bubbling or diffusing the air stream through a liquid bath of the silane being used to coat the aggregate. If this latter adaptation of my invention be employed, the bath of silane through which the air is passed may be maintained at an elevated temperature in order to secure a relatively high vapor pressure of the silane and thus facilitate its vaporization in the air treating stream.

My invention will be more clearly understood by reference to the drawing diagrammatically illustrating one embodiment of same. Referring specifically to the drawing, stone or other equivalent mineral aggregate is introduced by any suitable means through line or conveying means 1 into crushing zone 10. Crushing zone 10 may comprise any type, number, and arrangement of crushing stages as desired. The crushed stone or mineral aggregate is withdrawn from zone 10 by means of conveying means 2 and passed serially through a series of segregation stages 20, 30 and 40 which, for the purpose of illustration, are assumed to be a series of rotating or vibrating circular sieves. The smaller size mineral aggregates are segregated in zone 20, while the intermediate size mineral aggregates are segregated in zone 30 and the larger mineral aggregates in zone 40. The respective mineral aggregate streams fall through the respective screens into zones 21, 31 and 41, respectively. Air is blown through zone 21, introduced by means of line 22 and is withdrawn by means of line 23. The blown stone is removed from the bottom of zone 21 by conveying means 24. In accordance with the preferred adaptation of my invention, I utilize in the air stream a halide silane, preferably methyl trichlorsilane, and introduce this mixture of air and silane as described into zone 21 by means of line 22. In order to secure satisfactory removal of the dust from the aggregate, the air stream containing the methyl trichlorsilane comprises an air jet of a suitable velocity.

I withdraw the air-halide silane stream containing dust from zone 21 by means of line 23 and pass this stream through filtering or equivalent means 25, which means is adapted to substantially completely remove the dust from said stream. Zone 25 may comprise a bag filter or any other type of equipment suitable for removing dust from a vaporous stream. If cloth filters are used to remove the dust, the filter will be rendered water repellant, lengthening the useful life of the filter and aiding removal of moisture from the air stream. If desired, additional removal of moisture can be accomplished by cooling the exit gas from the filter and passing it through additional cloth filters. The air stream, freed of dust, is then introduced into zone 31 by means of line 26. In a similar manner to that described, the stone or other aggregate is removed from the bottom of zone 31 by conveying means 32. The air-halide silane stream is withdrawn from zone 31 by means of line 33 and passed through a filtering means 34, wherein dust is removed. This stream is removed from zone 34 by means of line 35 and introduced into zone 41. Crushed aggregate, substantially free of dust, is removed from zone 41 by conveying means 42. The air-halide silane stream is removed from zone 41 by means of line 43, passed through filtering means 44 and then preferably recycled to zone 21 by means of line 39 and line 22 as described. Although this stream may be recycled directly to zone 21, I prefer to pass the same through zone 50 wherein the concentration of the halide silane is raised to the desired degree.

In accordance with this embodiment of my process, I contact the smaller sized aggregate with the air stream containing the largest concentration of halide silane. The middle sized aggregate is contacted with an air stream containing an intermediate concentration of halide silane, while the largest sized particles are contacted with the air stream containing the smallest concentration of halide silane. It is to be understood that the number of segregation zones may be increased or decreased without affecting the concept and scope of my invention. It is also to be understood that the concentration of the halide silane in the air stream entering zone 31 or 41 may be raised to the desired degree by passing a portion of the air stream from line 22 into lines 26 and 35 by means of lines 51 and 52, respectively. It is to be understood that the rock may be wet or dry. It is also to be understood that it may be desirable to provide heating either of the halide silane in zone 50 through which the air stream is passed or to heat the air stream itself which will contain the halide silane. Zone 50 may comprise a liquid bath of halide silane through which the air stream passes or may comprise ejection means or any other suitable equipment for vaporizing the halide silane in the air stream.

The process of my invention may be further understood by the following examples illustrating the same.

*Example 1.*—A series of tests were conducted wherein trap rock was subjected to contact to methyl trichlorsilane and to various polymers of methyl trichlorsilane. In these tests the trap rock was placed in a screen type basket and the basket suspended in a closed container at about 75° F. which contained the methyl trichlorsilane vapors. In one series of tests the silane treated trap rock was mixed directly with asphalt, while in the other series of tests the silane treated trap rock was wetted with water and then mixed with the asphalt.

The pretreated trap rock was then coated with 6% of untreated cutback asphalt similar to the ASTM designation D597-40T for rapid curing cutback asphalt, type 2.

The amount of coating on the treated trap rock was evaluated to determine the efficiency of the pretreatment. The asphalt coated trap rock was then exposed to air for curing periods of 0, 1 and 2 hours, after which the aggregate was submerged in water for a period of sixteen hours.

The results of these tests are summarized below.

| Vapor from: | None | Methyl Trichlorsilane | X | Y |
|---|---|---|---|---|
| I. Dry Stone: | | | | |
| Mixing Ability [1] | 100 | 100 | 100 | 100 |
| Strip. Resist.[2]: | | | | |
| 0 hours curing | 0 | 100 | 5 | 0 |
| 1 hour curing | 0 | 100 | 5 | 0 |
| 2 hours curing | 20 | 100 | 5 | 0 |
| II. Wet Stone: | | | | |
| Mixing Ability | 75 | [3] 100 | [3] 85 | [3] 95 |
| Strip. Resist.: | | | | |
| 0 hours curing | 0 | 95 | 0 | 0 |
| 1 hour curing | 0 | 95 | 0 | 0 |
| 2 hours curing | 10 | 100 | 0 | 0 |

X Methyl trichlorsilane polymerized to a viscosity of 0.65 centistokes at 25° C.
Y Methyl trichlorsilane polymerized to a viscosity of 350 centistokes at 25° C.
[1] Mixing ability is the per cent of aggregate surface originally coated with asphalt after mixing.
[2] Stripping resistance is the per cent of aggregate surface remaining coated with asphalt after the sixteen hour period of submersion in water.
[3] Water does not wet these treated aggregates.

These results show that pretreatment of aggregate with silane vapors improves the ability of the asphalt to coat and adhere to the aggregate.

*Example 2.*—Trap rock was treated in the manner described in Example 1, except liquid silanes were employed. In these series of tests the liquid silanes were mixed in varying percentages of 0%, 0.5% and 1% with the mineral aggregate (crushed trap rock). The results of these tests are tabulated below.

| Percent Silicone | 0.0 | 0.5 | | | 1.0 | | |
|---|---|---|---|---|---|---|---|
| Type | | MCS | Type X | Type Y | MCS | Type X | Type Y |
| I. Dry Stone: | | | | | | | |
| Mixing Ability | 100 | 100 | 100 | 100 | 100 | 100 | 100 |
| Strip. Resist.: | | | | | | | |
| 0 hours curing | 0 | 100 | 0 | 65 | 100 | 5 | 80 |
| 1 hour curing | 0 | 100 | 0 | 75 | 100 | 5 | 90 |
| 2 hours curing | 20 | 100 | 0 | 70 | 100 | 5 | 80 |
| II. Wet Stone: | | | | | | | |
| Mixing Ability | 75 | 100 | 90 | 100 | 100 | 90 | 100 |
| Strip. Resist.: | | | | | | | |
| 0 hours curing | 0 | 100 | 0 | 10 | 100 | 0 | 30 |
| 1 hour curing | 0 | 100 | 0 | 15 | 100 | 0 | 30 |
| 2 hours curing | 10 | 100 | 0 | 25 | 100 | 0 | 50 |

Although the above tests were conducted utilizing 6% untreated RC-2 asphalt, it is to be understood that all types of bituminous binding material can be employed, such as road oils, flux asphalt, paving asphalt, cutback asphalts, or hard asphalt-flux combinations. It is further contemplated that conventional additives may be used with the asphalts. Particularly in the case where liquid silanes are mixed with the aggregate, improved bonding and coating results may be obtained if asphalts are used containing additives such as aliphatic organic amines, heavy metallic soaps, aluminum stearate, or zinc stearate. These additives are effective in supplementing the silane treatment to produce improved coating and bonding when for any reason the silane treatment alone is not sufficient.

Having now described my invention, I claim:

1. The process for the preparation of a bituminous composition which comprises segregating a mineral aggregate into portions of different particle sizes and treating said portions with the vaporized monomer of methyl trichlorsilane, portions of the mineral aggregate having larger particle sizes being treated with lower concentrations of vaporized halide silane than portions of the mineral aggregate having smaller particle sizes and thereafter mixing said treated aggregate with an asphalt.

2. The process as defined by claim 1 wherein the said treating of the mineral aggregate is accomplished by contacting the aggregate with a stream of air containing the vaporized methyl trichlorsilane.

3. The process defined by claim 2 in which the said stream of air containing methyl trichlorsilane is passed through the said portions of mineral aggregate so as to contact the portions of smaller particle size first.

JOSEPH C. ROEDIGER.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,258,219 | Rochow | Oct. 7, 1941 |
| 2,306,222 | Patnode | Dec. 22, 1942 |
| 2,386,259 | Norton | Oct. 9, 1945 |
| 2,415,833 | Mikeska | Feb. 18, 1947 |
| 2,427,488 | Anderson et al. | Sept. 16, 1947 |
| 2,436,304 | Johannson | Feb. 17, 1948 |

OTHER REFERENCES

Industrial & Engineering Chemistry, August 1946, pg. 17.

Abstract of Papers of 111th Meeting of American Chemical Society, April 1947, pgs. 71-81.